Oct. 9, 1962 W. W. SMITH ET AL 3,057,942
STORAGE BATTERY CONSTRUCTION
Filed Jan. 31, 1957 2 Sheets-Sheet 1
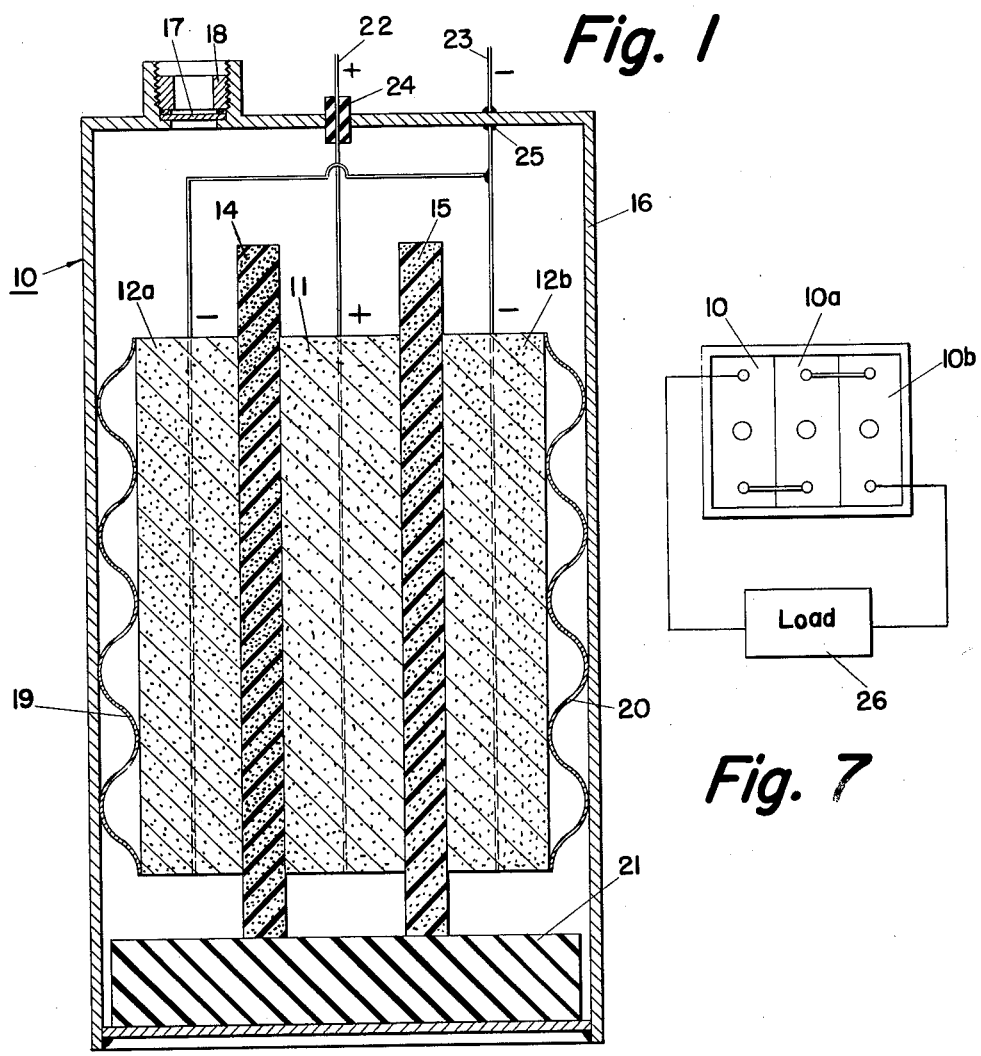
*Fig. 1*
*Fig. 7*
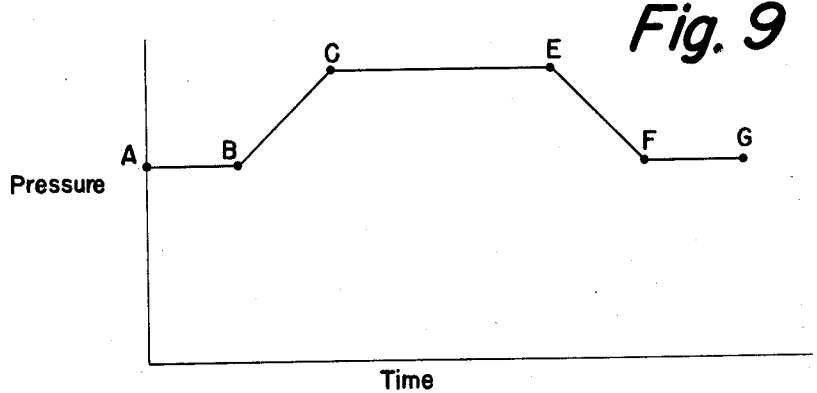
*Fig. 9*

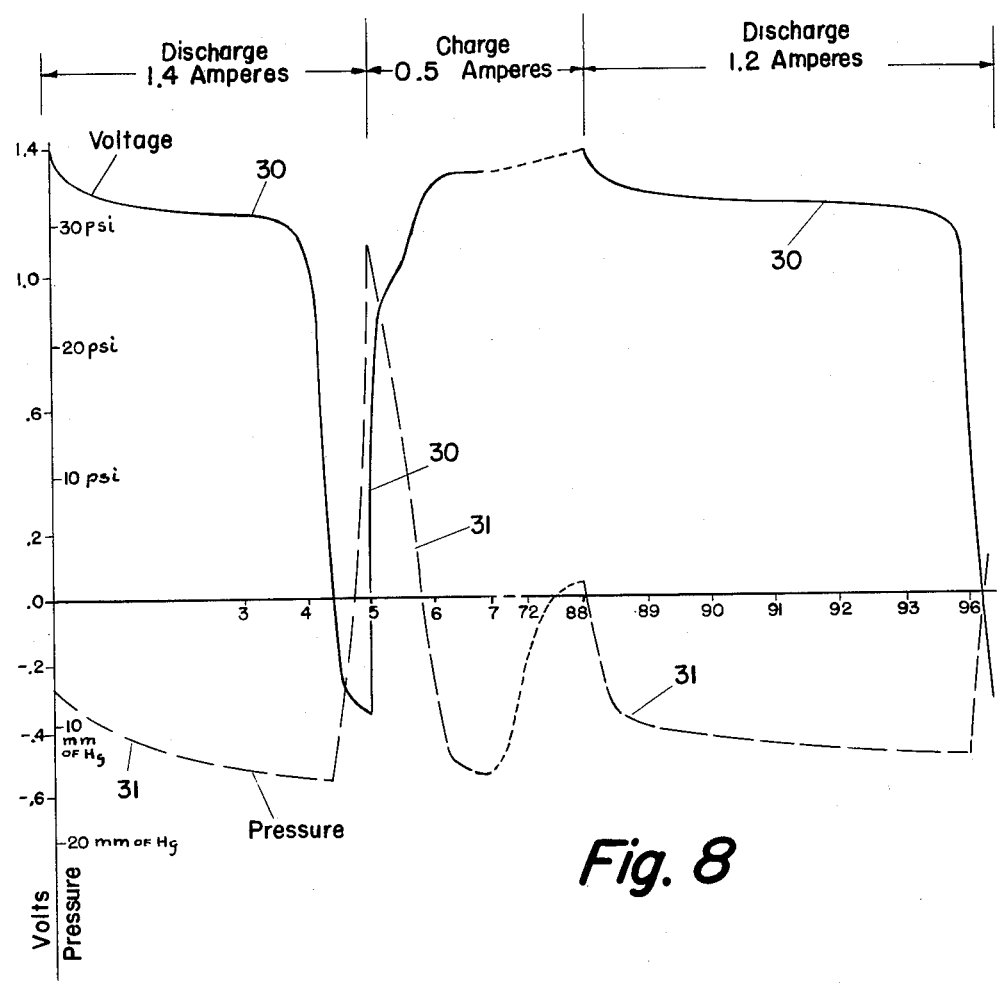

United States Patent Office 3,057,942
Patented Oct. 9, 1962

3,057,942
STORAGE BATTERY CONSTRUCTION
William W. Smith, Philadelphia, and Howard J. Strauss, Elkins Park, Pa., assignors to The Electric Storage Battery Company, a corporation of New Jersey
Filed Jan. 31, 1957, Ser. No. 637,510
10 Claims. (Cl. 136—6)

This invention relates to storage batteries and particularly to alkaline type storage batteries which have their containers hermetically sealed throughout their useful lives.

This application is a continuation-in-part of our earlier filed application for "Storage Battery Construction," Serial No. 543,051, filed October 27, 1955, and abandoned in favor of the present application as of its date of filing.

Storage batteries of the alkaline type are particularly useful for end uses, including military applications where high performance is of importance, notwithstanding the ambient temperature, whether it be sub-zero as in the Arctic or relatively high as in the tropical zone. The alkaline type battery is desirable from the standpoint of abuses which may occur in terms of extensive overcharge of the battery and overdischarge, as well as the requirements of withstanding severe shock and other mechanical abuses. The alkaline type battery has a lower rate of self-discharge than the equivalent type of lead-acid battery which means it has a longer shelf life. In the past, maintenance has been a disadvantage for the reason that during overcharge and overdischarge, water of the alkaline electrolyte is decomposed into its elemental components. The resultant evolution of hydrogen or oxygen depletes the electrolyte. The evolution of the gases likewise has made it difficult, if not impossible, to maintain the cells hermetically sealed during their normal lives.

In the past it has been proposed hermetically to seal batteries of the alkaline type, one requirement being that the electrochemical capacity of the negative electrode shall materially exceed the electrochemical capacity of the positive electrode. The theory advanced was that oxygen evolved during overcharge of the positive electrode would combine with the reduced or active metallic material of the negative electrode to form a hydroxide therewith. Contrary to the theories advanced by others, we have found that an excess of electrochemical capacity of the negative electrode is to be avoided if an alkaline type of storage battery is to be successfully operated during its normal life under hermetically sealed conditions.

In accordance with the present invention, we provide a hermetically sealed alkaline type of storage battery which does not develop unduly large or dangerous internal pressures at any time during its normal life, our hermetically sealed battery being characterized by the provision at the time of the sealing of the battery of charged material of the positive electrode in excess of the charged material of the negative electrode, and uncharged positive material in an amount not greater than the uncharged negative material. In addition to the excess of the charged material of the positive electrode, we provide a number of additional features which contribute to the improved operation we have secured, and these will be described at length in connection with the drawings.

For further objects and advantages of the invention, together with a discussion of the background theory which we believe applicable to our invention, reference is to be had to the following description taken in conjunction with the accompanying drawings, in which:

FIG. 1 is a sectional view of a hermetically sealed battery embodying the invention;

FIGS. 2–6 are figures explanatory of the operation of the battery during different conditions;

FIG. 7 is a plan view of a battery comprising three cells embodying the present invention;

FIG. 8 presents graphs explanatory of the operation of the cell of FIG. 1; and

FIG. 9 is an idealized graph of the operation of a typical embodiment of the invention.

Referring now to FIG. 1, the invention in one form has been shown as applied to a hermetically sealed cell 10 comprising a positive electrode 11 interposed between a negative electrode formed by the plates 12a and 12b. Interposed between the negative plates 12a and 12b and the opposite faces of the positive electrode 11 are separators 14 and 15. The assembly as a whole is disposed within a sealed container 16, the final sealing being illustrated as taking place at a metallic diaphragm 17 resting on supporting ledges of the container 16 and clamped in fluid-tight relation by means of a threaded collar 18. The collar 18 has a hexagonal opening to receive a tool for rotating it. The assembly is spaced from opposite walls of the container 16 by means of corrugated metallic spacers 19 and 20. Although not necessary, a block 21 of insulating material is located along the lower end of the container 16 for the purpose of providing additional support for the assembly. The lower ends of the separators 14 and 15 rest upon the block 21. The block 21 also provides heat insulation at the time of final assembly for the type of construction in which the lower end of the container 16 is bonded to the side walls, preferably as by welding or brazing, a welding bead being illustrated.

In FIG. 1 the housing 16 is shown with a somewhat larger gas space than will normally be utilized, the enlargement of the gas space at the upper end of cell 10 clarifying the illustration, and in particular, the illustration of the conductors, one of which from the positive electrode 11 extends in sealed relation through an insulator 24 to form the positive terminal 22. Other conductors extending from the plates 12a and 12b are electrically connected to the housing 16 as by welding and as indicated at 25. The negative terminal 23 is likewise welded or otherwise electrically attached to the housing 16, preferably made of steel, although, of course, any pressure-resisting material can be utilized which is inert in respect to the electrochemically active materials within the cell including the electrolyte and which is also impervious to gases, including those formed within the cell.

The invention is generally applicable to sealed alkaline type batteries of pocket, tubular, or sintered plate construction and is particularly useful in preventing the evolution of hydrogen gas on overcharge and on overdischarge. As exemplary of one application of the invention, the positive electrode 11 will be of conventional construction characterized by the provision of a porous plaque comprising sintered nickel particles for the supporting matrix. This porous plaque is impregnated with a nickel salt, usch as nickel nitrate. It is then treated with a precipitating agent, such as sodium hydroxide, to precipitate the nickel with resultant distribution of nickelous hydroxide throughout the plaque.

The supporting matrix of plates 12a and 12b comprising the negative electrode are likewise made from porous plaques comprising sintered nickel particles. The porous plaques are impregnated with a cadmium salt, such as cadmium chloride. It is treated with a precipitating agent, such as sodium hydroxide, to precipitate throughout the porous plaques cadmium hydroxide.

Though the electrodes can be formed in other ways, it has been found convenient to assemble the positive and negative electrodes in manner illustrated in FIG. 1. With the container 16 open to atmosphere, the electrodes are immersed in electrolyte, preferably a 30% aqueous solution of potassium hydroxide. With conventional charging and discharging currents, the plates are then formed by a number of cycles of charge and discharge. Usually four cycles will be adequate to form the electrodes to achieve maximum electrochemical capacity, meaning the formation at the electrodes of electrochemically active material in quantity for production of the maximum delivery of ampere hours from each.

As already explained, the positive electrode 11 in accordance with the present invention is to have charged material in excess of the charged material of the negative electrode at the time of the sealing of the cell. This requirement can be met in several ways, as will hereinafter be explained. To simplify the explanation of the construction shown in FIG. 1, it will be assumed that the electrochemically active material of the positive electrode exceeds that of the negative electrode. More particularly, and also as illustrative of an embodiment of the invention, it will be assumed the positive electrode will have electrochemically active material present in the amount corresponding with the delivery of eight ampere hours, whereas the electrochemically active material of the negative electrode comprising plates 12a and 12b will have a capacity for delivery of five ampere hours.

The excess of electrochemically active or charged material of the positive electrode may be readily attained by utilizing an excess in the quantity of impregnant over that used for the negative electrode in terms of ampere-hour capacity. For equality in ampere-hour delivery, there would be utilized about 5 grams per amper hour of nickel hydroxide and 3½ grams per ampere hour of cadmium hydroxide. To provide the desired excess of charged positive material, the impregnant for the positive electrode will be increased by 25%, and thus there will be deposited 6¼ grams of the nickel hydroxide for each 3½ grams of cadmium hydroxide. It is to be understood that the excess of 25% is representative of a typical embodiment of the invention but is not limited thereto, since, as will later be explained, the end use of the cell will have a bearing upon the degree with which the charged material of the positive electrode shall exceed that of the negative eletcrode. It is to be further understood that in view of the explanation thus far, those skilled in the art will know how to provide the excess of positive material where the cell includes other types of electrodes, such as silver-zinc and other types of alkaline cells. It is to be further understood that the positive and negative electrodes in the embodiment of FIG. 1 may include other metals or substances of the kind which have heretofore been conventionally added in minor proportions for the purpose of improving the electrical and physical characteristics of the cell. These substances, by way of example, include copper, graphite, iron and nickel.

After completion of the foregoing steps, the electrode 11 of FIG. 1 will have charged material corresponding with 8 ampere-hour capacity, while the negative electrode 12a, 12b will have charged material corresponding with 5 ampere hours.

With the plates fully charged, the electrolyte is now drained from the container 16 preparatory to the hermetic sealing thereof. In accordance with a further feature of the invention, the amount of electrolyte remaining in the cell-assembly is further reduced below that which will be retained by drainage alone. This reduction, of substantial degree, can be accomplished by application of vacuum to the container 16. In general, it will be more convenient to continue the flow of the charging current for a time interval after the drainage of the electrolyte from the container 16. The continued flow of charging current, because it decomposes some of the water present in the electrolyte, reduces the volume of electrolyte which has been retained throughout the porous assembly or structure comprising not only the positive and negative electrodes 11 and 12a—12b, but also the separators 14 and 15. Though it may not be necessary in every instance to continue the reduction in volume of the electrolyte in the assembly to a point where the cell voltage decreases, it has been found that as the electrolyte is volumetrically diminished, there arrives a point at which the cell voltage begins to decrease. This voltage reduction is a convenient measure of when the continued charging, after drainage of the electrolyte from the container 16, is to be discontinued. The charging could, of course, be continued beyond the point of reduction of the voltage but, in general, it will be found to be satisfactory to terminate charging when cell voltage begins to fall.

In a preferred form of the invention, the porous insulating material forming the separator is preferably microporous, capable of holding a substantial quantity of electrolyte and of a material inert to the electrodes and to the electrolyte. Microporous polyvinyl chloride separators of the type disclosed in U.S. Patent No. 2,542,527 to Honey and Hardy have been found highly satisfactory for the sealed cells of the present invention. Besides being highly porous, the pore sizes are small—in the micro or micron range—and without pores so large that electrolyte cannot be retained therein.

After the charging procedure described above, the assembly is ready to be sealed within the container. At this point the cell is characterized by a number of features of importance. The positive charged material exceeds the negative charged material. Furthermore, the porous separators and the porous electrodes contain electrolyte in an amount markedly less than they would retain in the absence of the electrolyte-removal treatment above described. The reasons for removing electrolyte from the assembly will be hereinafter set forth.

As already indicated, the cell 10 may be sealed either by welding the bottom wall of the container to the side walls or by the insertion of the diaphragm 17, with suitable gaskets, in the opening and the tightening of the locking collar 18. It is here emphasized that the hermetic sealing takes place at atmospheric pressure, and this fact is important in connection with the modification now being described.

After the hermetic sealing of the container 16, the oxygen of the atmosphere within the cell reacts with the cadmium metal of the negative electrode to form cadmium hydroxide. This reaction continues until the substantial exhaustion of oxygen from the atmosphere of the cell. Accordingly, the cell, after the sealing thereof, is characterized by the presence of a positive electrode having active material in excess of the negative electrode, and the negative electrode is characterized by the presence of both charged material and uncharged material. The hermetically sealed cell may, in respect to charge and discharge throughout its useful life, be treated in the same manner as unsealed alkaline cells. The cell is pressure-safe with the absence of any reasonable possibility of the development within the container 16 of excessive gas pressures.

In accordance with another modification of our invention, the amounts of uncharged chargeable material of the two electrodes after impregnation may be substantially identical in terms of ampere-hour capacities. In this embodiment, the electrodes 11 and 12a—12b of FIG. 1 will be electrochemically formed before asesmbly into the container 16, preferably against dummy negative and positive electrodes, respectively.

Following completion of the formation cycles, both the positive and negative plates are in a discharged condition. In accordance with the invention, and prior to the assembly of the plates within container 16, positive plate 11 is charged against a dummy negative electrode to a fractional part of its total capacity. If the electrodes 11 and 12a—12b have electrochemical capacities of, say, two ampere-hours, the positive electrode 11 will be charged until the electrochemically active or charged material thereof has the capability of delivering 0.5 ampere hour. The positive electrode is then removed from the treating tank and drained of electrolyte. Optionally, the electrodes to be assembled in cell 10 can then be washed and dried and used to form the assembly of FIG. 1. In accordance with this option, there will then be added to the assembly within cell 10 the quantity of electrolyte described above and less than the amount which will completely saturate the porous assembly. In accordance with the other optional procedure, the electrodes 11, 12a—12b together with the separators 14 and 15, fully saturated with electrolyte, will be brought together in the assembly of FIG. 1 and vacuum applied to the container 16 to reduce the volume of the electrolyte materially below its assembly-saturating value. The container 16 is now hermetically sealed. For this embodiment of the invention, it is unimportant whether the sealing takes place with normal atmosphere within the cell, or whether it be sealed under vacuum. Where suction has been applied in reduction of the quantity of electrolyte, it will, of course, be convenient to seal the cell under vacuum, since no additional expense is involved in evacuating the cell. When utilizing either the overcharge method or the vacuum-reduction of the electrolyte, it is to be noted that the removal of water therefrom increases the concentration of the electrolyte. Though this factor is not a critical one, it may be taken into account in the selection of the concentration of the electrolyte in the treating tanks. For example, it can correspond with a 25% solution instead of the 30% solution desired in the assembly after sealing of the cell.

There will now be presented our conception of what takes place within the hermetically sealed container 16 under the several conditions of operation and in terms of our last example. As shown in FIG. 2, and at the time of the sealing of the container 16, the positive electrode 11 consists of charged material 11c and uncharged chargeable material 11d, whereas all of the electrochemically active material of the negative electrode 12 consists of uncharged chargeable material 12d. After sealing, the cell 10 is placed on charge and, as illustrated in FIG. 3, the uncharged chargeable material 11d of FIG. 2 of the positive electrode 11 is converted to charged material 11c. Since there was an initial quantity of charged material 11c, FIG. 2, the negative electrode 12 at the time the positive electrode is fully charged is characterized by the presence of charged material 12c and of uncharged chargeable material 12d. Though in FIGS. 2 and 3 the charged material has been illustrated at the lower portions of the electrode, it is to be understood the charged material is uniformly distributed throughout the electrodes. This fact is of importance inasmuch as the total electrolyte present throughout the porous assembly is insufficient to fill the voids, and thus the assembly as a whole is to substantial degree permeable to gases within the container 16.

As charging is continued, FIG. 3, oxygen is evolved at the positive electrode 11. The oxygen fills the gas space within the container 16 and moves through the gas-permeable assembly. At the negative electrode formed by the plates 12a and 12b, the oxygen reacts with the metallic cadmium to form cadmium hydroxide. The rate at which this reaction occurs will depend on the partial pressure of oxygen within the cell which, in turn, is determined by the rate of the charging current. Throughout a wide range of charging currents there will be within the container 16, for the same temperatures, a range of pressures, each corresponding with a particular charging current. For any given charging current, there will be a maximum pressure which will be developed within the container 16. At the maximum pressure for a given charging current, the oxygen removal will take place at the same rate as the evolution of oxygen in the positive electrode.

From the foregoing, it will be seen that the container 16 need have a strength only adequate to provide a factor of safety against the maximum anticipated pressure at the minimum operating temperature. The evolution of oxygen occurs at a rate determined solely by the magnitude of the charging current, whereas the speed of the chemical reaction of the oxygen with the metallic cadmium of the negative electrode decreases with decrease of temperature. Hence, the pressure within container 16 will increase inversely with temperature: As the temperature of the cell 10 decreases, its gas pressure will increase when oxygen is being produced. In general, the container 16 of steel with thicknesses adequate to provide the desired ruggedness for handling and to withstand physical abuse will be more than adequate in terms of maximum internal pressures likely to be developed. In a cell having housing dimensions approximately 2½" wide, 4" high and ¾" thick, steel walls with a thickness of the order of .015" have been found satisfactory in a construction where such cells have been assembled together and the assembly of cells has, itself, been enclosed in a second container, as shown in FIG. 7.

After completion of charging, the cell 10 may be used for its intended purpose and to a point where it becomes fully discharged. In the fully discharged condition, FIG. 4, the electrodes 11 and 12 are returned to the same condition that they had at the time of sealing, as described above. When such cells are utilized to form a battery, as illustrated in FIG. 7, overdischarge of one or more of them can readily take place. If some of the cells have a greater current-delivering capability than the remaining cells, they will continue to supply current to an external circuit. In doing so, they will produce overdischarge of the cell with lesser current-delivering capacity. Assuming that the cell 10 has the lesser current-delivering capacity and that the cells 10a and 10b continue to deliver current to a load 26, the cell 10 will be overdischarged, and as a result there will arise the condition illustrated in FIG. 5. The positive electrode 11 will be further discharged. The negative electrode 12, which has theretofore been fully transformed to cadmium hydroxide, will decompose hydroxyl ions to form oxygen. This evolution of oxygen will produce a rise in the gas pressure within the container 16 so long as it occurs, since it does not chemically react with any of the material of the positive electrode 11.

The condition just described is not a serious one for the reason that after the completion of the charging of the cell, FIG. 3, the oxygen evolved at the positive electrode 11 during overcharge will, during the subsequent stand period, react with the metallic cadmium at the negative electrode. The reaction continues until the oxygen within container 16 has been substantially exhausted. This means that the pressure within container 16 drops to a relatively low value. This low subatmospheric pressure within container 16 persists during normal discharge of the cell. Accordingly, the gas space within container 16 provides a reserve adequate to receive the oxygen evolved at the negative electrode 12, FIG. 5, for a period of overdischarge materially beyond that normally encountered in any assembly of cells into a battery and without an excessive rise in pressure within the sealed cell 10.

The presence of the excess of charged material at the positive electrode after the sealing of the container 16 is of great importance in preventing the evolution of hydrogen during the overdischarge of the cell. In the absence of the excess of charged material of the positive electrode 11, that electrode would, on overdischarge, FIG. 6, evolve hydrogen at the same time the negative electrode 12 is evolving oxygen. Any evolution of hydrogen within the cell is to be avoided because it is not removed at either electrode during subsequent cycling of the battery. The effect of its evolution is cumulative, and each time it is evolved it increases the partial pressure of hydrogen within the container 16. As already indicated, however, by providing the excess of active positive material, the evolution of hydrogen is eliminated as a possibility, and thus the cell may for all practical purposes be permanently sealed.

The amount by which the electrochemically active material of the positive electrode must exceed that of the negative electrode will be determined in terms of the size and capacity of the final cell. Again, while the differential is not a critical one, for the example where the two electrodes have electrochemical capacities corresponding with two ampere hours, the suggested one-half ampere hour or 25% differential will be adequate. A greater factor of safety will, of course, be provided by a greater differential, and, conversely, for controlled conditions of operation, as by trained personnel, it may, of course, be reduced.

Now that the principles of the invention have been set forth in terms of two examples, it is to be understood that further variations may be made within the scope of the appended claims. For example, the cell may be hermetically sealed with the positive electrode 11 fully charged and the negative electrode 12 partially charged, as illustrated in FIG. 3. The container 16 may also be hermetically sealed with both electrodes 11 and 12 fully charged, providing there be added oxygen to the atmosphere within the cell prior to or at the time of sealing. The addition of oxygen, over and above atmospheric oxygen, will produce immediate self-discharge of the negative electrode 12. The introduction of oxygen into container 16 is continued until the negative electrode 12 is discharged by an amount which provides the disproportion as between the charged material of the negative electrode and the greater quantity of charged material of the positive electrode needed in accordance with the present invention. For a reduction in the charged material of the negative electrode corresponding with one-half ampere hour, oxygen will be required in amount corresponding with fifteen hundredths of a gram, which at atmospheric pressure at room temperature, will correspond with about 104 cubic centimeters.

Referring now to FIG. 8, the overall operation of a cell embodying the invention has been set forth in terms of typical characteristic curves. The cell corresponds with the first example described above and has a nominal rating of four ampere hours, the positive electrode having an eight ampere hour capacity in terms of the chargeable material thereof, with the negative electrode having chargeable material in quantity corresponding with five ampere hours.

Referring first to the curve 30, it has been plotted with time as abscissae and the voltage of the cell as ordinates. The open-circuit voltage for the cell is 1.4 volts. As it is discharged at 1.4 amperes, the voltage drops rather rapidly to 1.3 volts and thereafter slowly decreases to 1.18 volts and over a period of about 3½ hours. Inasmuch as the cell was placed on discharge shortly after charging thereof, a curve 31 plotted with time as abscissae and pressure as ordinates shows that initially there was a subatmospheric pressure of the order of 7½ inches of mercury. Had the cell been discharged at a later time, the pressure within the cell would have decreased as illustrated by the curve 31 until at the end of about 4 hours, the pressure within the cell would have been of the order of 14 inches of mercury, representing a subatmospheric pressure in the indicated amount. As discharge continues beyond the fourth hour thereof, the voltage, curve 30, decreases, and at about 4.4 hours reaches zero. With continued overdischarge, curve 30 illustrates the manner in which the cell voltage reverses. The curve 31 likewise illustrates how the evolution of oxygen at the negative electrode 12, FIG. 5, produces an increase in the pressure within the cell. The pressure first rises from the subatmospheric value of 14 inches of mercury to atmospheric pressure over a period of some twenty minutes. The pressure continues to rise and the reversed cell voltage increases in magnitude. Not only the reversal of the cell voltage on overdischarge, but also the increase in magnitude of the reversed cell voltage tend to limit the degree of overdischarge during normal conditions of operation. This will be readily understood by noting that the cell voltage decreases during discharge beyond the normal rated capacity of the cell. Continued overdischarge of a cell results in the reversal of polarity with its magnitude increasing with time. The reversed cell opposes the voltage of the remaining cells of a battery which produce the extended overdischarge. Since their voltage is decreasing and the reversed voltage is rising, as soon as they become equal the flow of discharge current as well as further evolution of oxygen ceases.

If desired, and particularly where there is a smaller differential in the charged material of the positive electrode with respect to that of the negative electrode, as low as 10%, protective means may be provided against an undue rise of gas pressure due to the evolution of hydrogen. This protective arrangement is provided by a frangible wall-portion designed to rupture when the pressure exceeds a predetermined value, for example, 100 pounds per square inch. This element is shown as the diaphragm or metallic disc 17 which is impervious to gases. Should the diaphragm rupture, as it might well do in the event an inexperienced workman should through error connect the cell to charging apparatus with reversed polarity, it is readily renewed. However, before returning the cell to service, and before resealing thereof, the steps previously described will be followed to assure an excess of charged chargeable material at the positive electrode in relation to the charged material at the negative electrode.

The overdischarge of the cell of FIG. 8 terminated upon attainment of a cell pressure of something less than 30 pounds per square inch, a reasonably low value in terms of requirements of container strength. Upon termination of the overdischarge of the cell, as by opening the circuit thereof, the voltage thereof rapidly increased, curve 30, to 0.95 volt. Recharging of the cell was initiated at a rate of one-half ampere.

As charging began, a lower oxide of nickel, such as nickelous hydroxide, representing the uncharged chargeable material of the positive electrode 11 is transformed to a higher oxide of nickel, such as nickelic hydroxide. At the same time, the cadmium hydroxide of the negative electrode 12 is transformed to metallic cadmium. However, due to the presence of oxygen in amount which had raised the pressure to approximately 30 pounds per square inch on overdischarge, there is immediate reaction of the oxygen at the negative electrode to form cadmium hydroxide from the metallic cadmium. Thus, while the positive electrode is accepting a charge and the nickelic hydroxide is increasing, the negative electrode is not accepting a charge in the sense that metallic cadmium is being formed. Instead, the negative electrode is effective in the removal of the oxygen. Its action in this respect is well illustrated by the curve 31 showing a reduction in the pressure within the container from about 30 pounds per square inch to atmospheric pressure and thereafter a further reduction in the pressure within the container to below atmospheric pressure and to a value of approximately 14 inches of mercury. The broken line portions of curves 30 and 31 represent changes in the time scale of the abscissae, the spacing between the beginning and end of the dotted portions corresponding with a time interval of 86 hours. During these 86 hours the charge at the rate of ½ ampere was continuous. Keeping in mind the fact that a normal charge for the cell would correspond with 140%, or approximately 20 hours charge at one-half ampere, it will be seen that the cell was subject to considerable overcharge, i.e., an overcharge of approximately 66 hours, not counting the 40% overcharge to which cells are normally subjected. Notwithstanding this long overcharge, the pressure within the cell did not rise above 2 pounds per square inch.

Immediately following the long period of overcharge, the cell is then discharged again at the rate of 1.2 amperes. It will be seen that voltage curve 30 has substantially the same shape as during the first period of discharge, though of much greater time duration due to the decreased rate of discharge. The pressure curve 31 is likewise similar in shape with the cell pressure again rapidly falling to a low subatmospheric value. It does not again increase until there is reversal of polarity of the cell. Subsequent charging and discharging cycles on the same cell have the same characteristics, and in no case was there any evidence of a permanent build-up of pressure within the cell, nor was there evidence of any loss of electrochemical capacity.

In accordance with the idealized curve of FIG. 9 plotted with time as abscissae and pressure as ordinates, discharge of a cell in which the pressure had normalized or become constant at a subatmospheric value is shown initiated at the point A. The constancy of pressure during normal discharge is represented by the line AB, B representing the point at which the charged material of the negative electrode becomes exhausted. Since there is no gas evolution in the period AB, the pressure within the cell remains constant. If the overdischarge be continued during the period BC, the negative electrode evolves oxygen gas which is represented in FIG. 9 by an increase of pressure within the cell. The excess of charged material at the positive electrode is sufficient so that it will not be converted to uncharged chargeable material at the end of a period of time in excess of that likely to be encountered under any service conditions involving overdischarge. Thus the maximum rise of pressure within the cell likely to be encountered is indicated at the point C. The interval between C and E is representative of a relatively long stand period. Inasmuch as the negative electrode has long since been fully discharged, the pressure within the cell remains constant. With charging of the cell initiated at E, there is immediate reaction of the oxygen with the metallic material then formed at the negative, and the pressure within the cell rapidly declines until it is stabilized at the point F. As the charging continues, at normal rate, the pressure within the cell will remain constant and does not increase until conditions of overcharge have been attained with evolution of oxygen at the positive electrode, as illustrated in FIG. 3. The conditions arising during overcharge are illustrated in FIG. 8.

It is to be understood that the graphs of FIGS. 8 and 9 will differ with cells of differing design, but in general will exhibit similar characteristics. In this connection, the maximum pressure within the sealed container of a given cell will be materially higher if the removal of the electrolyte of the assembly be discontinued before the beginning of a decrease in the voltage of the cell. In other words, as the amount of electrolyte is decreased below that required to fill all pores of the assembly, the resistance to diffusion of oxygen through the assembly to the charged material decreases. As we conceive the phenomena, a film of the electrolyte continues to wet all of the surface of each pore though absent in pore-filling quantity. The reduction in resistance to diffusion of the oxygen through all of the pores greatly reduces the equilibrium pressure attained within the cell for given conditions of operation. A reduction in the electrolyte substantially beyond the point at which the cell voltage begins to decrease will adversely affect performance, though it will materially reduce the aforesaid pressure. These related factors, being understood, provide considerable flexibility in design to meet different desired conditions of operation with a variety of embodiments of the present invention.

What is claimed is:

1. A sealed storage battery cell characterized by the fact that as the sealed cell is charged the chargeable material of the positive electrode is converted to charged material capable at all times of delivering a greater amount of electrical energy than the charged material of the negative electrode, said negative electrode when said positive electrode is fully charged also including uncharged chargeable material.

2. A sealed storage battery cell including an assembly of porous positive and negative electrodes with interposed porous insulating material, said cell after the sealing thereof being characterized by said positive electrode having charged material in excess of the charged material of said negative electrode, said negative electrode including a substantial amount of uncharged chargeable material but its total of charged and uncharged chargeable material in terms of ampere-hour delivery after full charging thereof being less than that of said positive electrode after full charging thereof, and by electrolyte contained solely in said porous assembly in quantity materially less in said electrodes and in said insulating material than required to fill the pores of said electrodes and of the insulating material, thereby to provide ease of flow of oxygen to an extended surface area of charged material at the negative electrode which removes oxygen by self-discharge of said negative electrode.

3. The method of limiting the rise of pressure within a sealed storage battery cell which comprises mounting an assembly within an empty unsealed container, which assembly includes a positive electrode which has been partially charged and an uncharged negative electrode with porous insulating material disposed therebetween, said positive electrode having a greater charging capacity than said negative electrode the assembly as a whole being saturated with electrolyte, passing between the electrodes a charging current which after fully charging the positive electrode produces evolution of oxygen therefrom, continuing the overcharge of said positive electrode until the cell voltage begins to decrease, the quantity of electrolyte within the assembly thereby being reduced to a predetermined volume and thereafter hermetically sealing said container, whereby oxygen subsequently formed at said positive electrode combines with the active material of the negative electrode to limit the rise of pressure during overcharge, and the cell reverses in polarity during overdischarge thereof and well before evolution of hydrogen therein.

4. A sealed storage battery cell characterized by the fact that at all times the positive electrode includes charged material capable of delivering a greater amount of electrical energy than the charged material of the negative electrode, said negative electrode at all times also including uncharged chargeable material.

5. A storage cell of the alkaline type comprising a sealed container having a free gas space therein and having an electrode assembly comprising spaced positive and negative electrodes contacting an alkaline electrolyte, said positive electrode comprising an active material which is oxidized during charge and said negative electrode comprising an active material which is reduced during charge and which is capable of re-combining with oxygen in said gas space evolved from said positive electrode, said positive electrode having a higher charge content than said negative electrode when said cell is sealed and said positive electrode having also a substantially lesser amount of effectively active material in the uncharged state than said negative electrode when said cell is sealed, whereby during charge the negative electrode will have still a reserve charge capability when the positive electrode becomes fully charged and during discharge the positive electrode will have still a reserve discharge capability when the negative electrode is fully discharged.

6. A storage cell comprising a sealed container having a free gas space therein, an alkaline electrolyte, an electrode assembly comprising spaced positive and negative electrodes contacting said electrolyte, at least the negative electrode of said assembly having portions contacting also said gas space, said positive electrode comprising an active material which is oxidized during charge and said negative electrode comprising an active material which is reduced during charge and which is capable of re-combining with oxygen in said gas space evolved from said positive electrode, said positive electrode having a higher charge content than said negative electrode when said cell is sealed and said positive electrode having also a substantially lesser amount of effectively active material in the uncharged state than said negative electrode when said cell is sealed, whereby during charge the negative electrode will have still a reserve charge capability when the positive electrode becomes fully charged and during discharge the positive electrode will have still a reserve discharge capability when the negative electrode is fully discharged.

7. The storage cell of claim 6 in which said electrolyte is wholly contained within said electrode assembly.

8. The storage cell of claim 6 in which the total active material in terms of charge capability for the negative electrode exceeds the total active material in terms of charge capability of the positive electrode.

9. The storage cell of claim 6 in which said electrode assembly includes porous insulating material and in which said alkaline electrolyte is present in quantity less than that required wholly to fill the pores of said assembly.

10. The sealed storage battery cell of claim 9 in which the sum of the charged and uncharged material of the negative electrode exceeds the sum of the charged and uncharged material of the positive electrode, each in terms of their respective charging capabilities.

References Cited in the file of this patent

UNITED STATES PATENTS

| | | |
|---|---|---|
| 2,422,045 | Ruben | June 10, 1947 |
| 2,554,504 | Ruben | May 29, 1951 |
| 2,571,927 | Neumann et al. | Oct. 16, 1951 |
| 2,646,455 | Jeannin | July 21, 1953 |
| 2,651,669 | Neumann | Sept. 8, 1953 |
| 2,708,211 | Koren et al. | May 10, 1955 |